United States Patent
Cimpeanu et al.

(10) Patent No.: US 8,747,955 B2
(45) Date of Patent: Jun. 10, 2014

(54) METHOD OF PRODUCING PACKAGING HAVING FAT BARRIER PROPERTIES

(75) Inventors: Carmen-Elena Cimpeanu, Ludwigshafen (DE); Thomas Breiner, Laudenbach (DE); Dieter Urban, Speyer (DE); Hermann Seyffer, Heidelberg (DE); Volker Schaedler, Ann Arbor, MI (US); Robert Feuerhake, Mannheim (DE); Soumyajit Roy, Strasbourg (FR); Michel Awkal, Saint Louis (FR)

(73) Assignee: BASF SE, Ludwigshafen (DE)

( * ) Notice: Subject to any disclaimer, the term of this patent is extended or adjusted under 35 U.S.C. 154(b) by 443 days.

(21) Appl. No.: 13/057,919

(22) PCT Filed: Aug. 13, 2009

(86) PCT No.: PCT/EP2009/060495
§ 371 (c)(1),
(2), (4) Date: Feb. 7, 2011

(87) PCT Pub. No.: WO2010/020581
PCT Pub. Date: Feb. 25, 2010

(65) Prior Publication Data
US 2011/0143156 A1    Jun. 16, 2011

(30) Foreign Application Priority Data
Aug. 21, 2008 (EP) .................................... 08162769

(51) Int. Cl.
*B05D 1/36* (2006.01)
*B05D 7/00* (2006.01)

(52) U.S. Cl.
USPC ............. 427/411; 427/407.1; 53/170; 53/396

(58) Field of Classification Search
USPC .......................... 427/407.1, 477; 53/170, 396
See application file for complete search history.

(56) References Cited

U.S. PATENT DOCUMENTS

| | | | | |
|---|---|---|---|---|
| 5,320,812 A | * | 6/1994 | Harper | 422/549 |
| 5,578,598 A | * | 11/1996 | Abe et al. | 514/2.4 |
| 5,863,956 A | * | 1/1999 | Kistenmacher et al. | 521/31 |
| 6,022,908 A | | 2/2000 | Ma et al. | |
| 6,486,245 B1 | * | 11/2002 | Thunemann et al. | 524/130 |
| 2006/0021150 A1 | * | 2/2006 | Hu et al. | 8/115.51 |
| 2007/0092718 A1 | | 4/2007 | Murphy et al. | |
| 2010/0291169 A1 | * | 11/2010 | Toreki et al. | 424/405 |
| 2011/0189487 A1 | | 8/2011 | Zacharias et al. | |
| 2011/0305916 A1 | | 12/2011 | Schmidt-Thümmes et al. | |

FOREIGN PATENT DOCUMENTS

| | | |
|---|---|---|
| CN | 1236793 A | 12/1999 |
| DE | 44 28 641 | 2/1996 |
| DE | 10 2005 007 483 | 8/2006 |
| EP | 1 498 544 | 1/2005 |
| JP | 10-204792 * | 8/1998 |
| WO | 2006 087344 | 8/2006 |
| WO | 2011 020769 | 2/2011 |
| WO | 2011 023587 | 3/2011 |

OTHER PUBLICATIONS

Taniguchi et al., JP 10-204792 machine translation, Aug. 4, 1998.*
U.S. Appl. No. 13/391,143, filed Feb. 17, 2012, inventor Cimpeanu et al.
U.S. Appl. No. 13/389,680, filed Feb. 9, 2012, inventor Cimpeanu et al.
Chinese Office Action Issued Dec. 17, 2012 in Patent Application No. 200980132675.9 (English translation only).

* cited by examiner

*Primary Examiner* — Timothy Meeks
*Assistant Examiner* — Michael P Rodriguez
(74) *Attorney, Agent, or Firm* — Oblon, Spivak, McClelland, Maier & Neustadt, L.L.P.

(57) ABSTRACT

A description is given of a method of producing packaging, the packaging surface being coated with a polyelectrolyte complex, and the polyelectrolyte complex being composed of at least one first polymer and at least one second polymer, the first polymer being an anionic polymer and the second polymer being a cationic polymer. The packaging is distinguished by good fat barrier properties.

14 Claims, No Drawings

METHOD OF PRODUCING PACKAGING HAVING FAT BARRIER PROPERTIES

CROSS REFERENCE TO RELATED APPLICATIONS

The present application is a 35 U.S.C. §371 national stage patent application of International patent application PCT/EP09/060,495, filed on Aug. 13, 2009, the text of which is incorporated by reference, and claims the benefit of the filing date of European application no. EP 08162769.7, filed on Aug. 21, 2008, the text of each also being incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

1. Field of the Invention

The invention relates to a method of producing packaging, the packaging surface being coated with a polyelectrolyte complex, and the polyelectrolyte complex being composed of at least one first polymer and at least one second polymer, the first polymer being an anionic polymer, and the second polymer being a cationic polymer. The packaging is distinguished by good fat barrier properties.

When packaging oily or fatty products it is important that the packaging materials used have a high resistance to penetration by fats and oils, or good fat barrier properties. There are a variety of known methods suitable for endowing packaging materials, especially those based on paper or card with resistance to penetration by fats and oils. For this purpose the materials may be coated or impregnated, for example, with solutions or aqueous dispersions of natural or synthetic polymers, paraffins, waxes or fluorinated hydrocarbons. The coating or impregnating compositions in question include, for example, solutions of starches and starch derivatives, galactomannans, carboxymethylcelluloses, polyvinyl alcohols or solutions of other synthetic polymers, such as anionic polyacrylamides, for example. The level of greaseproofing possessed by paper produced by such a method is low. Also known are methods whereby the paper, inside or outside the paper machine, is coated or impregnated with aqueous dispersions of polymers, paraffins or waxes. Known additionally are methods whereby high resistances to penetration by fats and oils are imparted to papers by extrusion coating using melts of polymers, hotmelts, waxes or paraffins.

2. Description of the Related Art Including Information Disclosed Under 37 CFR 1.97 and 1.98

EP 1498544 discloses coatings based on polymer emulsions for cellulose substrates with barrier properties. The polymers are ethylene-vinyl acetate copolymers (EVA). US 2007092718 discloses a method of improving the fat and/or water resistance of materials, where the material is treated with wax and polyvinyl alcohol. DE 10 2005 007 483 discloses aqueous dispersions of predominantly anionically charged polyelectrolyte complexes.

Fat barrier coatings with polymer-based films frequently lack sufficient flexibility. In that case, when creasing or folding, in the region of fold sites, e.g. edges or corners of folding boxes or cartons, there may be damage to the barrier film and consequently insufficient fat barrier effects.

BRIEF SUMMARY OF THE INVENTION

It was an object of the present invention to provide a method which allows the production of packaging having good fat and oil barrier properties, including not least in the region of the folds, creases and corners. This packaging ought to be highly temperature-resistant, flexible and blocking-resistant, and ought as far as possible to comprise no substances harmful to health, such as heavy metals, for example, and no fluorocarbon compounds.

The invention provides a method of producing packaging, at least part of the packaging surface being coated with at least one polyelectrolyte complex, the polyelectrolyte complex being composed of at least one first polymer and at least one second polymer, the first polymer being an anionic polymer and the second polymer being a cationic polymer.

The invention also provides packaging produced from a packaging material whose surface is at least partly coated with a polyelectrolyte complex, the polyelectrolyte complex being composed of at least one first polymer and at least one second polymer, the first polymer being an anionic polymer and the second polymer being a cationic polymer.

The invention also provides for the use of polyelectrolyte complexes for producing coated packaging, at least part of the surface of the packaging being coated with at least one polyelectrolyte complex, the polyelectrolyte complex being composed of at least one first polymer and at least one second polymer, the first polymer being an anionic polymer and the second polymer being a cationic polymer.

The coating produced with the polyelectrolyte complex preferably has fat barrier properties. The barrier properties can be measured by the penetration test, which is described in the examples. The term "fat barrier property" implies relative to the uncoated substrate an increased resistance of a substrate surface to the penetration of fats, oils, and fatlike and oillike, hydrophobic substances.

BRIEF DESCRIPTION OF THE SEVERAL VIEWS OF THE DRAWINGS

Not Applicable.

DETAILED DESCRIPTION OF THE INVENTION

Polyelectrolytes are ionic polymers. Polyelectrolyte complexes are the reaction products of ionic polymers with opposite charges. Generally speaking, the polyelectrolyte complexes have a defined stoichiometric composition, i.e. the equivalent ratio of anionic and cationic groups in these complexes is, or is close to 1. Alternatively, the polyelectrolyte complexes may also have a predominantly anionic or predominantly cationic charge. In accordance with the invention, besides such polyelectrolyte complexes, it is also possible for there to be a cationic polymer or an anionic polymer present additionally in excess, i.e. in a free, noncomplexed form.

Preference is given to using aqueous dispersions of polyelectrolyte complexes. The polyelectrolyte complexes are preferably predominantly anionically charged. The dispersions can be obtained by free-radical polymerization of ethylenically unsaturated anionic monomers in aqueous medium in the presence of at least one cationic polymer. In one embodiment, the anionic monomers are used in an amount such that the number of anionic groups in the anionic monomers exceeds the number of cationic groups in the cationic polymers by at least 1 mol %, measured at pH 7 and 20° C. A suitable preparation process is described for example in DE 10 2005 007 483.

The amount of cationic polymer used for preparing the polyelectrolyte complex is preferably such that, for each mole of anionic groups of the anionic polymer, or in the total anionic monomers used in the polymerization, use is made, for example, of up to 150 mol % or up to 100 mol %, preferably 1 to 99 mol % or 2 to 50 mol % of cationic groups of at least one cationic polymer, measured at pH 7 and 20° C. The polyelectrolyte complexes formed with less than 100 mol % of cationic groups are predominantly anionically charged at pH 7 and 20° C.

Anionic polymers are polymers having anionic groups, especially organic polymers having carboxylate, phosphate or sulfate groups. It is also possible to use the corresponding silanes, provided they are either neutralized by bases comprised in the reaction medium or converted into anionic groups by basic groups of the cationic polymer.

Suitable anionic polymers are, for example, those formed by free-radical addition polymerization of ethylenically unsaturated, free-radically polymerizable anionic polymers. They include, among others, copolymers of at least one anionic monomer and one or more different nonionic copolymerizable monomers.

Examples of suitable ethylenically unsaturated anionic monomers include monoethylenically unsaturated $C_3$ to $C_{10}$ or $C_3$ to $C_5$ carboxylic acids such as acrylic acid, methacrylic acid, ethacrylic acid, crotonic acid, maleic acid, fumaric acid, vinylsulfonic acid, styrenesulfonic acid, acrylamidomethylpropanesulfonic acid, vinylphosphonic acid, itaconic acid and the alkali metal, alkaline earth metal or ammonium salts of these acids. The anionic monomers used with preference include acrylic acid, methacrylic acid, maleic acid and 2-acrylamido-2-methylpropanesulfonic acid. Aqueous dispersions of polymers based on acrylic acid are particularly preferred. The anionic monomers may be polymerized either alone, to form homopolymers or else in a mixture with one another, to form copolymers. Examples thereof are the homopolymers of acrylic acid, homopolymers of methacrylic acid or copolymers of acrylic acid and maleic acid, copolymers of acrylic acid and methacrylic acid, and copolymers of methacrylic acid and maleic acid.

The polymerization of the anionic monomers may alternatively be carried out in the presence of at least one other ethylenically unsaturated monomer. These monomers may be nonionic or else carry a cationic charge. Examples of nonionic comonomers are acrylamide, methacrylamide, N—$C_1$ to $C_3$-alkylacrylamides, N-vinylformamide, acrylic esters of monohydric alcohols having 1 to 20 C atoms, such as, more particularly methyl acrylate, ethyl acrylate, isobutyl acrylate and n-butyl acrylate, methacrylic esters of monohydric alcohols having 1 to 20 C atoms such as methyl methacrylate and ethyl methacrylate, for example vinyl acetate and vinyl propionate. Suitable cationic monomers which are copolymerizable with the anionic monomers are dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropyl-methacrylamides, diallyldimethylammonium chloride, vinylimidazole, and the basic monomers each quaternized and/or neutralized with acids. Specific examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dimethylaminoethylacrylamide, dimethylaminoethyl-methacrylamide, dimethylaminopropylacrylamide, dimethylaminopropyl-methacrylamide, diethylaminoethylacrylamide and diethylaminopropylacrylamide.

The basic monomers may be quaternized and/or neutralized only partly or else completely, in each case to an extent of 1% to 99%, for example. A quaternizing agent used preferably for the basic monomers is dimethyl sulfate. Alternatively the quaternization of the monomers can be carried out with diethyl sulfate or with alkyl halides such as methyl chloride, ethyl chloride or benzyl chloride. The cationic monomers are used at most in amounts such that the resulting polyelectrolyte complexes carry an anionic charge overall at pH levels <6.0 and a temperature of 20° C. The anionic excess charge in the resulting amphoteric polymers is, for example, at least 5 mol %, preferably at least 10 mol %.

In the preparation of the anionic polyelectrolyte complexes, the comonomers are used, for example in amounts such that the resulting polymer dispersions, on dilution with water and at pH levels above 7.0 and a temperature of 20° C., are water-soluble and have an anionic charge. Based on the monomers used overall in the polymerization, the amount of nonionic and/or cationic comonomers is, for example, 0% to 99%, preferably 5% to 75% by weight and is situated mostly in the range from 5% to 25% by weight.

Examples of preferred copolymers are copolymers of 25% to 90% by weight acrylic acid and 75% to 10% by weight acrylamide. It is preferred to polymerize at least one ethylenically unsaturated $C_3$ to $C_5$ carboxylic acid in the absence of other monoethylenically unsaturated monomers. Particular preference is given to homopolymers of acrylic acid, which are obtainable by free-radical polymerization of acrylic acid in the absence of other monomers.

In one embodiment the anionic polymer comprises 2-acrylamido-2-methyl-propanesulfonic acid (AMPS). Preferably acrylic acid is copolymerized with AMPS. The amount of AMPS in this case may be, for example, 0.1 to 15 mol % or from 0.5 to 10 mol %, based on the amount of all the monomers.

The polymerization may additionally be carried out in the presence of at least one crosslinker. In that case copolymers are obtained which have a higher molar mass than if the anionic monomers are polymerized in the absence of a crosslinker. Incorporating a crosslinker into the polymers results, moreover, in reduced solubility of the polymers in water. Depending on the amount of crosslinker copolymerized, the polymers become insoluble in water, but are swellable in water. Crosslinkers which can be used are all compounds which possess at least two ethylenically unsaturated double bonds in the molecule. Examples of crosslinkers are triallylamine, pentaerythritol triallyl ether, pentaerythritol tetraallyl ether, methylene bisacrylamide, N,N'-divinylethyleneurea, allyl ethers comprising at least two allyl groups or vinyl ethers comprising at least two vinyl groups, of polyhydric alcohols such as, for example, sorbitol, 1,2-ethanediol, 1,4-butanediol, trimethylolpropane, glycerol, diethylene glycol and of sugars such as sucrose, glucose and mannose, dihydric alcohols having 2 to 4 C atoms and esterified fully with acrylic acid or methacrylic acid, such as ethylene glycol dimethacrylate, ethylene glycol diacrylate, butanediol dimethacrylate, butanediol diacrylate, diacrylates or dimethacrylates of polyethylene glycols having molecular weights of 300 to 600, ethoxylated trimethylenepropanetriacrylates or ethoxylated trimethylenepropane trimethacrylates, 2,2-bis(hydroxymethyl)butanol trimethacrylate, pentaerythritol triacrylate, pentaerythritol tetraacrylate and triallylmethylammonium chloride. If crosslinkers are used when preparing the dispersions of the invention, the amounts of crosslinker used in each case are, for example, 0.0005% to 5.0%, preferably 0.001% to 1.0% by weight, based on the monomers employed overall in the polymerization. Crosslinkers used with preference are pentaerythritol triallyl ether, pentaerythritol tetraallyl ether, N,N'-divinylethyleneurea, allyl ethers comprising at least two allyl groups of sugars such as sucrose, glucose or mannose and triallylamine and also mixtures of these compounds.

If the polymerization of at least one anionic monomer is carried out in the presence of at least one crosslinker, it is preferred to prepare crosslinked copolymers of acrylic acid and/or methacrylic acid, by polymerizing acrylic acid and/or methacrylic acid in the presence of pentaerythritol triallyl ether, pentaerythritol tetraallyl ether, N,N'-divinylethyleneurea, allyl ethers comprising at least two allyl groups of sugars such as sucrose, glucose or mannose or triallylamine and also mixtures of these compounds. Depending on the amounts of crosslinkers used in the polymerization, the resulting polyelectrolyte complexes are swellable or soluble in dilute aqueous solution at pH levels >7.0.

The cationic polymers used to form the polyelectrolyte complexes are preferably water-soluble, i.e. they have a solubility in water of at least 1 g/l at 20° C. Cationic polymers are polymers having cationic groups, especially organic polymers having quaternary ammonium groups. It is also possible to use polymers having primary, secondary or tertiary amine groups, provided they are protonated and so converted into cationic groups, either by acids comprised in the reaction medium or by acid groups of the anionic polymer. The amine and/or ammonium groups of the cationic polymer may be present as substituents or as part of the polymer chain. They may also be part of an aromatic or nonaromatic ring system.

Suitable cationic polymers are, for example, polymers from the group of
(a) polymers comprising vinylimidazolium units,
(b) polydiallyldimethylammonium halides,
(c) polymers comprising vinylamine units,
(d) polymers comprising ethyleneimine units,
(e) polymers comprising dialkylaminoalkyl acrylate and/or dialkylaminoalkyl methacrylate units and
(f) polymers comprising dialkylaminoalkylacrylamide and/or dialkylaminoalkylmethacrylamide units.

Examples of cationic polymers are
(a) homopolymers of vinylimidazolium methosulfate and/or copolymers of vinylimidazolium methosulfate and N-vinylpyrrolidone,
(b) polydiallyldimethylammonium chlorides,
(c) polyvinylamines,
(d) polyethyleneimines,
(e) polydimethylaminoethyl acrylate, polydimethylaminoethyl methacrylate, copolymers of acrylamide and dimethylaminoethyl acrylate and copolymers of acrylamide and dimethylaminoethyl methacrylate, it also being possible for the basic monomers to be present in the form of the salts with mineral acids or in quaternized form, and
(f) polydimethylaminoethylacrylamide, polydimethylaminoethylmethacrylamide and copolymers of acrylamide and dimethylaminoethylacrylamide.

The basic monomers may also be present in the form of the salts with mineral acids or in quaternized form. The average molar masses $M_w$ of the cationic polymers are at least 500. They are situated, for example, in the range from 500 to 1 million, preferably from 1000 to 500 000 or 2000 to 100 000.

As cationic polymers it is preferred to use
(a) homopolymers of vinylimidazolium methosulfate and/or copolymers of vinylimidazolium methosulfate and N-vinylpyrrolidone having an average molar mass $M_w$ of in each case 500 to 500 000,
(b) polydiallyldimethylammonium chlorides having an average molar mass $M_w$ of 1000 to 500 000,
(c) polyvinylamines having an average molar mass $M_w$ of 500 to 1 million and
(d) polyethyleneimines having an average molar mass $M_w$ of 500 to 1 million.

The copolymers of vinylimidazolium methosulfate and N-vinylpyrrolidone that are listed under (a) comprise, for example, 10 to 90% by weight of N-vinylpyrrolidone in copolymerized form. Instead of N-vinylpyrrolidone it is possible as a comonomer to use at least one compound from the group of ethylenically unsaturated $C_3$ to $C_5$ carboxylic acids such as acrylic acid or methacrylic acid in particular, or the esters of these carboxylic acids with monohydric alcohols comprising 1 to 18 C atoms, such as methyl acrylate, ethyl acrylate, isopropyl acrylate, n-butyl acrylate, isobutyl acrylate, methyl methacrylate, ethyl methacrylate or n-butyl methacrylate.

Suitability as polymers of group (b) is possessed preferably by polydiallyldimethylammonium chloride. Also suitable are copolymers of diallyldimethylammonium chloride and dimethylaminoethyl acrylate, copolymers of diallyldimethylammonium chloride and dimethylaminoethyl methacrylate, copolymers of diallyldimethylammonium chloride and diethylaminoethyl acrylate, copolymers of diallyldimethylammonium chloride and dimethylaminopropyl acrylate, copolymers of diallyldimethylammonium chloride and dimethylaminoethylacrylamide and copolymers of diallyldimethylammonium chloride and dimethylaminopropylacrylamide. The copolymers of diallyldimethylammonium chloride comprise, for example, 1 to 50, usually 2 to 30 mol % of at least one of the stated comonomers in copolymerized form.

Polymers (c) comprising vinylamine units are obtainable by polymerizing N-vinylformamide if appropriate in the presence of comonomers and hydrolyzing the vinylformamide polymers, with elimination of formyl groups, to form amino groups. The degree of hydrolysis of the polymers can be, for example, 1% to 100%, and is mostly situated in the range from 60% to 100%. The average molar masses $M_w$ are up to 1 million. Polymers comprising vinylamine units are sold, for example, as Catiofast® products by BASF SE.

Polymers of group (d) comprising ethyleneimine, such as polyethyleneimines are likewise commercial products. They are sold, for example, under the name Polymin® by BASF SE, e.g. Polymin® SK. These cationic polymers are polymers of ethyleneimine, prepared by polymerizing ethyleneimine in an aqueous medium in the presence of small amounts of acids or acid-forming compounds such as halogenated hydrocarbons, examples being chloroform, carbon tetrachloride, tetrachloroethane or ethyl chloride, or are condensation products of epichlorohydrin and compounds comprising amino groups such as monoamines and polyamines, examples being dimethylamine, diethylamine, ethylenediamine, diethylenetriamine and triethylenetetramine or ammonia. They have, for example, molar masses $M_w$ of 500 to 1 million, preferably 1000 to 500 000.

This group of cationic polymers also includes graft polymers of ethyleneimine on compounds which contain a primary or secondary amino group, examples being polyamidoamines formed from dicarboxylic acids and polyamines. The ethyleneimine-grafted polyamidoamines can if appropriate be reacted further with difunctional crosslinker, such as, for example, with epichlorohydrin or bis-chlorohydrin ethers of polyalkylene glycols.

Suitable cationic polymers of group (e) include polymers comprising dialkylaminoalkyl acrylate and/or dialkylaminoalkyl methacrylate units. These monomers can be used in the form of the free bases, but preferably in the form of the salts with mineral acids such as hydrochloric acid, sulfuric acid or phosphoric acid and also in quaternized form, for the polymerization. Suitable quaternizing agents include, for example, dimethyl sulfate, diethyl sulfate, methyl chloride, ethyl chloride, cetyl chloride or benzyl chloride. These monomers can be used to prepare not only homopolymers but also copolymers. Examples of suitable comonomers include acrylamide, methacrylamide, N-vinylformamide, N-vinylpyrrolidone, methyl acrylate, ethyl acrylate, methyl methacrylate and mixtures of said monomers.

Cationic polymers of group (f) are polymers comprising dimethylaminoethylacrylamide or dimethylaminoethylmethacrylamide units, comprising the basic monomers in the form, preferably, of the salts with mineral acids or in quaternized form. They may be homopolymers and copolymers. Examples are homopolymers of dimethylaminoethyl-acrylamide, that has been fully quaternized with dimethyl sulfate or with benzyl chloride; homopolymers of dimethylaminoethylmethacrylamide which has been fully quaternized with dimethyl sulfate, methyl chloride, ethyl chloride or benzyl chloride; and copolymers of acrylamide and dimethylaminoethylacrylamide that has been quaternized with dimethyl sulfate.

In the preparation of the aqueous dispersions of the invention it is preferred to use the following cationic polymers:
(a) homopolymers of vinylimidazolium methosulfate and/or copolymers of vinylimidazolium methosulfate and N-vinylpyrrolidone having an average molar mass $M_w$ of in each case 1000 to 100 000,
(b) polydiallyldimethylammonium chlorides having an average molar mass $M_w$ of 2000 to 100 000, and/or
(c) polyvinylamines having an average molar mass $M_w$ of 1000 to 500 000. The polyvinylamines are used preferably in the form of the salts with sulfuric acid or hydrochloric acid.

Besides those polymers constructed solely from cationic monomers, it is also possible to employ amphoteric polymers as cationic polymers, subject to the proviso that overall they carry a cationic charge. The cationic excess charge in the amphoteric polymers is, for example, at least 5 mol %, preferably at least 10 mol % and is usually situated in the range from 15 to 95 mol %. Examples of amphoteric polymers having a cationic excess charge are copolymers of acrylamide, dimethylaminoethyl acrylate and acrylic acid, which comprise at least 5 mol % more dimethylaminoethyl acrylate than acrylic acid in copolymerized form;

copolymers of vinylimidazolium methosulfate, N-vinylpyrrolidone, and acrylic acid, which comprise at least 5 mol % more vinylimidazolium methosulfate than acrylic acid in copolymerized form;

hydrolyzed copolymers of N-vinylformamide and an ethylenically unsaturated $C_3$ to $C_5$ carboxylic acid, preferably acrylic acid or methacrylic acid, with a vinylamine unit content which is higher by at least 5 mol % than the ethylenically unsaturated carboxylic acid unit content;

copolymers of vinylimidazole, acrylamide and acrylic acid, the pH being chosen such that at least 5 mol % more vinylimidazole is cationically charged than acrylic acid is copolymerized.

Aqueous dispersions of polyelectrolyte complexes can be prepared by subjecting the anionic monomers in question, if appropriate in the presence of other monomers, to free radical polymerization in the presence of cationic polymers in an aqueous medium. The amount of basic and of cationic monomers in this case can be chosen such that the resulting polymer complexes always carry an excess of anionic charge, as determined at a pH of 7 and at 20° C. The charge density of the polyelectrolytes and polyelectrolyte complexes can be determined in accordance with D. Horn, Progr. Colloid & Polymer Sci., Volume 65, 251-264 (1978).

Basic polymers used preferably in the form of the salts with mineral acids or organic acids such as formic acid or acetic acid in the polymerization. These salts are formed in any case during the polymerization, since the polymerization is carried out at a pH<6.0.

The aqueous dispersions of predominantly anionically charged polyelectrolyte complexes that are preferred in accordance with the invention can be prepared by free-radical polymerization of ethylenically unsaturated anionic monomers in an aqueous medium in the presence of at least one water-soluble cationic polymer, using preferably 0.5 to 49 mol % of at least one cationic polymer, per mole of anionic monomers used in total in the polymerization. The polymerization takes place in an aqueous medium at a pH below 6, such as, for example, in the range from 0 to 5.9, preferably 1 to 5 and more particularly from 1.5 to 3. The appropriate pH is usually a product of the use in the polymerization of acid-group-comprising polymers in the form of the free acid groups. The pH can be varied within the stated range by adding a base such as, in particular, aqueous sodium hydroxide or potassium hydroxide solution for the partial neutralization of the acid groups of the anionic monomers. Where, however, alkali metal salts, alkaline earth metal salts or ammonium salts of the anionic monomers are the starting materials, either a mineral acid or an organic acid such as formic acid, acetic acid or propionic acid is added in order to adjust the pH.

The polymerization can if appropriate be carried out additionally in the presence of at least one chain transfer agent. In that case the polymers obtained possess a lower molar mass than polymers prepared without chain transfer agents. Examples of chain transfer agents are organic compounds comprising sulfur in bonded form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea, aldehydes, organic acids such as formic acid, sodium formate or ammonium formate, alcohols such as, in particular isopropanol, and also phosphorus compounds, such as sodium hypophosphite. A single chain transfer agent or two or more chain transfer agents may be used in the polymerization. If they are used in the polymerization, they are employed, for example, in an amount of 0.01% to 5.0%, preferably 0.2% to 1% by weight, based on the overall monomers. The chain transfer agents are preferably used together with at least one crosslinker in the polymerization. By varying the amount and the proportion of chain transfer agent and crosslinker it is possible to control the rheology of the resultant polymers. In the polymerization, chain transfer agents and/or crosslinkers for example may be introduced as an initial charge in the aqueous polymerization medium or metered together or separately from the monomers into the polymerization batch in accordance with the progress of the polymerization.

In the polymerization it is usual to use initiators which form free radicals under the reaction conditions. Examples of suitable polymerization initiators are peroxides, hydroperoxides, hydrogen peroxide, sodium persulfate or potassium persulfate, redox catalysts and azo compounds such as 2,2-azobis (N,N-dimethyleneisobutyramidine) dihydrochloride, 2,2-azobis(4-methoxy-2,4-dimethylvaleronitrile), 2,2-azobis(2, 4-dimethylvaleronitrile) and 2,2-azobis(2-amidinopropane) dihydrochloride. The initiators are used in the amounts usual in the polymerization. Polymerization initiators used with preference are azo initiators. Alternatively the polymerization can be initiated with the aid of high-energy radiation such as electron beams or by irradiation with UV light.

The polymerization of the anionic monomers is carried out, for example, batchwise, by introducing the monomers and at least one cationic compound in a polymerization zone and metering in the polymerization initiator in portions or continuously. Preference is given, however, to a semi-batch procedure, in which water and polymerization initiator are introduced and at least one anionic monomer and at least one cationic polymer are metered in continuously under polymerization conditions. An alternative is to introduce the initiator continuously or in portions, but separately from the monomer feed and from the metering of cationic polymer into the polymerization zone. An alternative procedure is first to introduce a portion of the monomers, 5 to 10% by weight, for example, together with a corresponding fraction of at least one cationic polymer in a polymerization zone, to start the polymerization in the presence of an initiator, and to add the remaining portion of the monomers, of the cationic polymer and of the initiator continuously or in portions. In all cases, the polymerization is typically accomplished in the absence of oxygen under an inert gas atmosphere such as under nitrogen or helium, for example. The polymerization temperatures are situated, for example, in the range from 5 to 100° C., preferably 15 to 90° C. and usually at 20 to 70° C. The polymerization temperature is very dependent on the particular initiator that is employed.

The concentration of the polyelectrolyte complexes in the aqueous dispersions or solutions that are used for coating is preferably at least 1%, more particularly at least 5%, and up to 50% or up to 60% by weight. Usually the amount of polyelectrolyte complexes in the aqueous dispersion is 1% to 40% or 5% to 35% by weight, more particularly 15% to 30% by weight.

Preferred aqueous dispersions of the polyelectrolyte complexes, at pH levels below 6.0 and at a temperature of 20° C., have a viscosity of 100 to 150 000 mPas, or 200 to 5000 mPas (measured with a Brookfield viscometer at 20° C., 20 rpm, spindle 4). Depending on the polymerization conditions and on the particular monomers or combinations of monomers and auxiliaries such as chain transfer agents, that are used, the polyelectrolyte complexes have different molar masses. The average molar mass $M_w$ of the polyelectrolyte complexes is, for example, 1000 to 10 million, preferably 5000 to 5 million and is situated usually in the range from 10 000 to 3 million. The molar mass is determined by means of light scattering. The average particle size of the dispersed polyelectrolyte complexes is, for example, 0.1 to 200 µm, preferably 0.5 to 70 µm. It can be determined, for example, by means of optical microscopy, of light scattering or of freeze fracture electron microscopy.

Embodiments of the invention are, in particular, the use of polyelectrolyte complexes formed from homopolymers of acrylic acid and polymers comprising vinylimidazolium units;

homopolymers of acrylic acid and homopolymers having vinylimidazolium units;

homopolymers of acrylic acid and copolymers of monomers having vinylimidazolium units and vinyllactams, especially vinylpyrrolidone;

copolymers of acrylic acid with 2-acrylamido-2-methyl-propanesulfonic acid and polymers comprising vinylimidazolium units;

copolymers of acrylic acid with 2-acrylamido-2-methyl-propanesulfonic acid and homopolymers having vinylimidazolium units;

copolymers of acrylic acid with 2-acrylamido-2-methyl-propanesulfonic acid and copolymers of monomers having vinylimidazolium units and vinyllactams, especially vinylpyrrolidone.

For the package in the context of the method of the invention, suitable substrates are coated with an aqueous solution or dispersion of at least one polyelectrolyte complex. Suitable substrates are, in particular, paper, card, and films and foils of plastic or metal, for example. The solutions or dispersions that are used for coating may comprise further additives or auxiliaries, examples being thickeners for adjusting the rheology, wetting assistants or binders.

Application may be made, for example, on coating machines, by applying the coating composition to paper, cardboard or to a support film or foil made of a plastic or a metal. Where materials in web form are used, the polymer dispersion is typically applied from a trough via an application roll and leveled with the aid of an airbrush. Other ways of applying the coating are accomplished, for example, with the aid of the reverse gravure method, with spraying methods or with a rotating doctor.

In one embodiment, the polyelectrolyte complex is formed only in situ on the packaging material, by applying two coating compositions simultaneously or in one workstep immediately after one another by means of cascade coating, for example, with one of the coating compositions comprising at least one anionic polymer and the other coating composition comprising at least one cationic polymer. In this case it is preferred first to apply at least one first coating composition which comprises at least one cationic polymer having primary, secondary or tertiary amine groups and then at least one second coating composition which comprises at least one anionic polymer having acid groups. The cationic polymers with amino groups are, for example, polymers having units selected from the group consisting of vinylamine, ethyleneimine, dialkylaminoalkyl acrylate, dialkylaminoalkyl methacrylate, dialkylaminoalkylacrylamide, dialkylaminoalkylmethacrylamide and mixtures thereof; more particularly polyvinylamines, polyethyleneimines, polydimethylaminoethyl acrylate, polydimethylaminoethyl methacrylate, copolymers of acrylamide and dimethyl-aminoethyl acrylate and copolymers of acrylamide and dimethylaminoethyl methacrylate. The anionic polymers having acid groups are for example polymers having units selected from acrylic acid, methacrylic acid, maleic acid, 2-acrylamido-2-methylpropanesulfonic acid and mixtures thereof, especially homopolymers of acrylic acid and copolymers of acrylic acid and 2-acrylamido-2-methylpropanesulfonic acid.

In order further to improve the adhesion to a film, the support film may be subjected to corona treatment beforehand. The amounts applied to the sheet materials are, for example, preferably 1 to 10 g (polymer, solids) per m², preferably 2 to 7 g/m² in the case of films and foils, and preferably 10 to 30 g/m² in the case of paper or card. After the polyelectrolyte complexes have been applied to the sheet substrates, the solvent is evaporated. This can be done in the case of continuous operation, for example, by passing the material through a drier tunnel, which may be equipped with an infrared irradiation apparatus. Thereafter the coated and dried material is passed over a cooling roll and, finally, wound up. The thickness of the dried coating is preferably 1 to 50 μm, more preferably 2 to 20 μm.

The substrates coated with the polyelectrolyte complex exhibit an outstanding barrier action to fats and oils, especially in the region of creases, folds and corners of packaging made of paper or card. The coated substrates can be used as they are as packaging means, preferably for foodstuffs. The coatings have very good mechanical properties and exhibit, for example, good blocking behavior and substantially no cracks.

To obtain specific surface properties or coating properties of the packaging means, such as good printability, even better sealing and blocking behavior, and good water resistance, for example, it can be advantageous to coat the coated substrates with top coats which additionally impart these desired properties. The recoatability of the substrates with a prior polyelectrolyte complex coating is good. The recoating may take place again by a method as indicated above, or coating may be carried out multiply in a continuous operation without the film, foil or paper, for example, being wound and unwound in between. Consequently, the fat barrier coat is located in the interior of the system, and the surface properties are then determined by the topcoat. The adhesion of the topcoat to the fat barrier coat is good.

By the method described it is possible in a simple way to produce coatings impervious to fats and oils, on films, for example, made of oriented polypropylene or polyethylene, the polyethylene having been prepared either by the high-pressure or the low-pressure polymerization process of ethylene. Examples of other suitable support films are films of polyester, such as polyethylene terephthalate, and films of polyamide, polystyrene and polyvinyl chloride. Additionally suitable support materials are papers and metal foils such as aluminum foil. The thickness of the support films and foils is situated generally in the range from 10 to 200 μm, in the case of polyamide films 30 to 50 μm, in the case of polyethylene terephthalate films 10 to 40 μm, in the case of polyvinyl chloride films about 200 μm and in the case of polystyrene films about 20 μm.

Particular preference is given to support materials of paper or cardboard, particularly for the production of coated folding boxes.

EXAMPLES

Abbreviations and products used are as follows:

| | |
|---|---|
| AA | acrylic acid |
| AMPS | 2-acrylamido-2-methylpropanesulfonic acid |
| K1 | copolymer of 25% vinylimidazolium chloride and 75% vinylpyrrolidone |
| K2 | copolymer of 43% vinylimidazolium chloride and 57% vinylpyrrolidone |
| K3: | homopolymer of vinylimidazolium methosulfate |
| QVI | vinylimidazole quaternized with a methyl group |
| V50 | 2,2'-azobis(2-amidinopropane) dihydrochloride |

Examples 1-5

Preparation of the Polyelectrolyte Complex

An amount of water sufficient for the preparation of a 20% by weight dispersion is admixed with the amounts of acrylic acid, ammonium hydroxide solution, and AMPS shown in the table below. In parallel the cationic polymer is supplied, in the amounts shown in the table below. When 0.1 mol % of the V50 initiator has been added, a complex is formed and emulsion polymerization takes place simultaneously in a nitrogen atmosphere at 50° C., with stirring, over the course of 5 hours.

TABLE 1

| | | Quantities in mol | | | |
|---|---|---|---|---|---|
| Example | Cat. polymer | QVI [1] | NH4OH | AA | AMPS |
| 1 | K1 | 0.03 | 0.03 | 1 | 0 |
| 2 | K2 | 0.053 | 0.053 | 1 | 0 |
| 3 | K3 | 0.1 | 0.1 | 1 | 0 |
| 4 | K2 | 0.069 | 0 | 0.945 | 0.055 |
| 5 | K2 | 0.052 | 0.047 | 0.99 | 0.01 |

[1] amount of QVI (constituent of the cationic polymer)

20% aqueous dispersions of polyelectrolyte complexes are obtained, with viscosities of 250 to 1500 mPas.

Coated Paper

Without further purification, the polyelectrolyte complex dispersions are used to coat paper. The paper used has a basis weight of 60-80 g/m². The paper is precoated with a pigmented coating slip so as to form a thin polymer coating (0.5 μm) for pore leveling. Using a rotating doctor, the precoated paper is coated with in each case one of dispersions 1 to 5 in a coat thickness between 15 and 20 μm (after drying).

Example 6

A first coating composition comprises 6% by weight of polyvinylamine in water. A second coating composition comprises 20% by weight of polyacrylic acid in water. The paper stated above is coated first with 3.5 g/m² of the first coating composition and then with 12 g/m² of the second coating composition.

Example C1 (Comparative)

Coating with Cationic Polymer

The paper stated above is coated with 10 g/m² of a coating composition, which as its sole polymer comprises 20% by weight of a 5% hydrolyzed poly(N-vinylformamide) in water.

Example C2 (Comparative)

Coating with Anionic Polymer

The paper stated above is coated as above with a coating composition, which comprises as its sole polymer 20% by weight of polyacrylic acid in water.

Barrier Tests

The investigations below were carried out with papers coated on one side with polyelectrolyte complexes. The thickness of the coating was 20 μm and the weight per unit area was 20 g/m² (dry). The size of the sheets of paper was 20 cm×30 cm.

The films are flexible and stable up to (at least) 80° C. The coatings are blocking-resistant at 80° C. After heating at 80° C. for 72 hours under a pressure of 100 N/m², no degeneration or tackiness is apparent.

3M Kit Test—Barrier Properties at Crease Points

The test uses 12 test solutions, T1 to T12:

| Test solution | Castor oil (ml) | Toluene (ml) | n-heptane (ml) |
|---|---|---|---|
| T1 | 200 | 0 | 0 |
| T2 | 180 | 10 | 10 |
| T3 | 160 | 20 | 20 |
| T4 | 140 | 30 | 30 |
| T5 | 120 | 40 | 40 |
| T6 | 100 | 50 | 50 |
| T7 | 80 | 60 | 60 |
| T8 | 60 | 70 | 70 |
| T9 | 40 | 80 | 80 |
| T10 | 20 | 90 | 90 |
| T11 | 0 | 100 | 100 |
| T12 | 0 | 90 | 110 |

5 samples of each of the coated papers, measuring 5×5 cm, are used. One drop of a middle test solution (e.g. T7) is dropped from a height of 2.5 cm onto the coated side of a paper sample. After 15 seconds the drop is wiped up with an absorbent material and the contaminated site is inspected. If the site appears stained, the test is repeated with a test solution having a lower number (e.g. T6). If the contaminated site appears unstained, the test is repeated with a test solution having a higher number (e.g. T8), the repeat tests taking place on an uncontaminated area of the paper sample.

A test series with unfolded, smooth paper and a test series with folded paper are carried out. In the case of the test series with folded paper, the coated paper is folded together and unfolded again. The test solutions are in this case applied dropwise to the fold produced by folding. A record is made of the highest-numbered test solution for which no staining was observed. The final value is the average value from 5 investigations, rounded to 0.5.

The results are summarized in Table 2.

TABLE 2

| | 3M kit test results | |
|---|---|---|
| Example | unfolded surface | folded surface |
| 1 | 12 | 9 |
| 2 | 12 | 9 |
| 3 | 12 | 10 |
| 4 | 12 | 12 |
| 5 | 12 | 12 |
| 6 | 12 | 9 |
| C1 | <8 | <8 |

The target minimum requirements of penetration values of at least 8-9 for folded paper and of 12 for unfolded paper were attained or surpassed by all of the inventive examples.

Penetration Test

The test substances used were as follows:
a) oleic acid
b) mixture of 900 g of turpentine and 100 g of mineral oil with a boiling point of 100-140° C. and 2.5 g of Sudan blue The test substance is applied to the coated side of the paper. In the case of test substance b) owing to the volatility of the substance, application of the substance was repeated from time to time in order to ensure continual wetting. After the time periods shown in the table below, a determination is made of the percentage fraction of blue-colored fat sites on the uncoated paper surface. The values reported correspond to the approximate percentage of surface colored blue.

TABLE 3

| | Penetration test with oleic acid | | | | | | |
|---|---|---|---|---|---|---|---|
| Example | 10 min | 60 min | 5 h | 1 d | 2 d | 3 d | 7 d |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 1 |
| 6 | 0 | 0 | 0[1] | — | — | — | — |
| C1 | 100 | — | — | — | — | — | — |
| C2 | 0 | 1 | 20 | — | — | — | — |

[1] after 6 hours

The target minimum requirements of 24 hours of complete penetration resistance to oleic acid were surpassed by all of the inventive examples.

TABLE 4

| | Penetration test with turpentine/mineral oil | | |
|---|---|---|---|
| Example | 10 min | 60 min | 5 h |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0[1] |
| C1 | 100 | — | — |

[1] after 6 hours

The invention claimed is:

1. A method of producing food packaging, the method comprising:
    coating at least part of a surface of the food packaging with at least one polyelectrolyte complex; wherein the at least one polyelectrolyte complex comprises at least one first polymer and at least one second polymer, the first polymer being an anionic polymer and the second polymer being a cationic polymer,
    wherein the polyelectrolyte complex is predominantly anionically charged,
    wherein the cationic polymer is at least one polymer comprising at least one unit selected from the group consisting of a vinylimidazolium unit, a polydiallyldimethylammonium halide, a vinylamine unit, an ethyleneimine unit, a dialklyaminoalkyl acrylate unit, a dialkylaminoalkyl methacrylate unit, a dialkylaminoalkylacrylamide unit, and a dialkylaminoalkylmethacrylamide unit,
    wherein the substrate of the food packaging material is paper or cardboard and wherein the packaging does not comprise fluorocarbon compounds, and
    wherein the coating produced with the polyelectrolyte complex has a fat barrier property.

2. The method according to claim 1, the method further comprising:
    shaping a substrate to form packaging; and
    before, during, or after the shaping of the packaging, carrying out the coating.

3. The method according to claim 1, wherein the anionic polymer is at least one polymer prepared from at least one monomer selected from the group consisting of a monoethylenically unsaturated $C_3$ to $C_{10}$ carboxylic acid, vinyl sulfonic acid, a styrenesulfonic acid, acrylamidomethylpropanesulfonic acid, vinylphosphonic acid, a salt of a monoethylenically unsaturated $C_3$ to $C_{10}$ carboxylic acid, a salt of vinyl sulfonic acid, a salt of a styrenesulfonic acid, a salt of acrylamido-methylpropanesulfonic acid, and a salt of vinylphosphonic acid.

4. The method according to claim 3, wherein the anionic polymer is at least one selected from the group consisting of a homopolymer of acrylic acid, a copolymer of acrylic acid and acrylamidomethylpropanesulfonic acid, a homopolymer of methacrylic acid, and a copolymer of methacrylic acid and acrylamidomethylpropanesulfonic acid.

5. The method according to claim 1, wherein the cationic polymer is at least one polymer comprising at least one vinylimidazolium unit.

6. The method according to claim 1, wherein a first and a second coating composition are applied simultaneously or one immediately after another, wherein the first coating composition comprises the first polymer and the second coating composition comprises the second polymer.

7. The method according to claim 6, wherein first at least the first coating composition is applied and comprises at least one anionic polymer having at least one acid group, and then at least the second coating composition is applied and comprises at least one cationic polymer having at least one primary, secondary, or tertiary amine group.

8. The method according to claim 1, wherein the coating takes place with the polyelectrolyte complex in the form of an aqueous dispersion.

9. The method according to claim 8, wherein the aqueous dispersion comprises 1% to 40% by weight of polyelectrolyte complex.

10. The method according to claim 1, wherein an amount of cationic polymer in the polyelectrolyte complex is such that, for each mole of anionic groups of the anionic polymer, 1 to 99 mol % of cationic groups of the at least one cationic polymer, measured at pH 7 and 20° C., are present.

11. The method according to claim 1, wherein an amount of cationic polymer in the polyelectrolyte complex is such that, for each mole of anionic groups of the anionic polymer, 2 to 50 mol % of cationic groups of the at least one cationic polymer, measured at pH 7 and 20° C., are present.

12. The method according to claim 4, wherein the anionic polymer comprises a homopolymer of acrylic acid or a homopolymer of methacrylic acid.

13. The method according to claim 1, wherein the anionic polymer comprises 2-acrylamido-2-methyl-propanesulfonic acid (AMPS).

14. The method according to claim 1, wherein the cationic polymer comprises vinylimidazole quaternized with a methyl group.

* * * * *